Dec. 26, 1967  V. F. WIGAL  3,360,219
AIRCRAFT HAVING AIR BLAST POWERED LIFTING ROTOR
Filed July 11, 1966  3 Sheets-Sheet 1

INVENTOR.
VOORHIS F. WIGAL
BY John R. Walker, III
Attorney

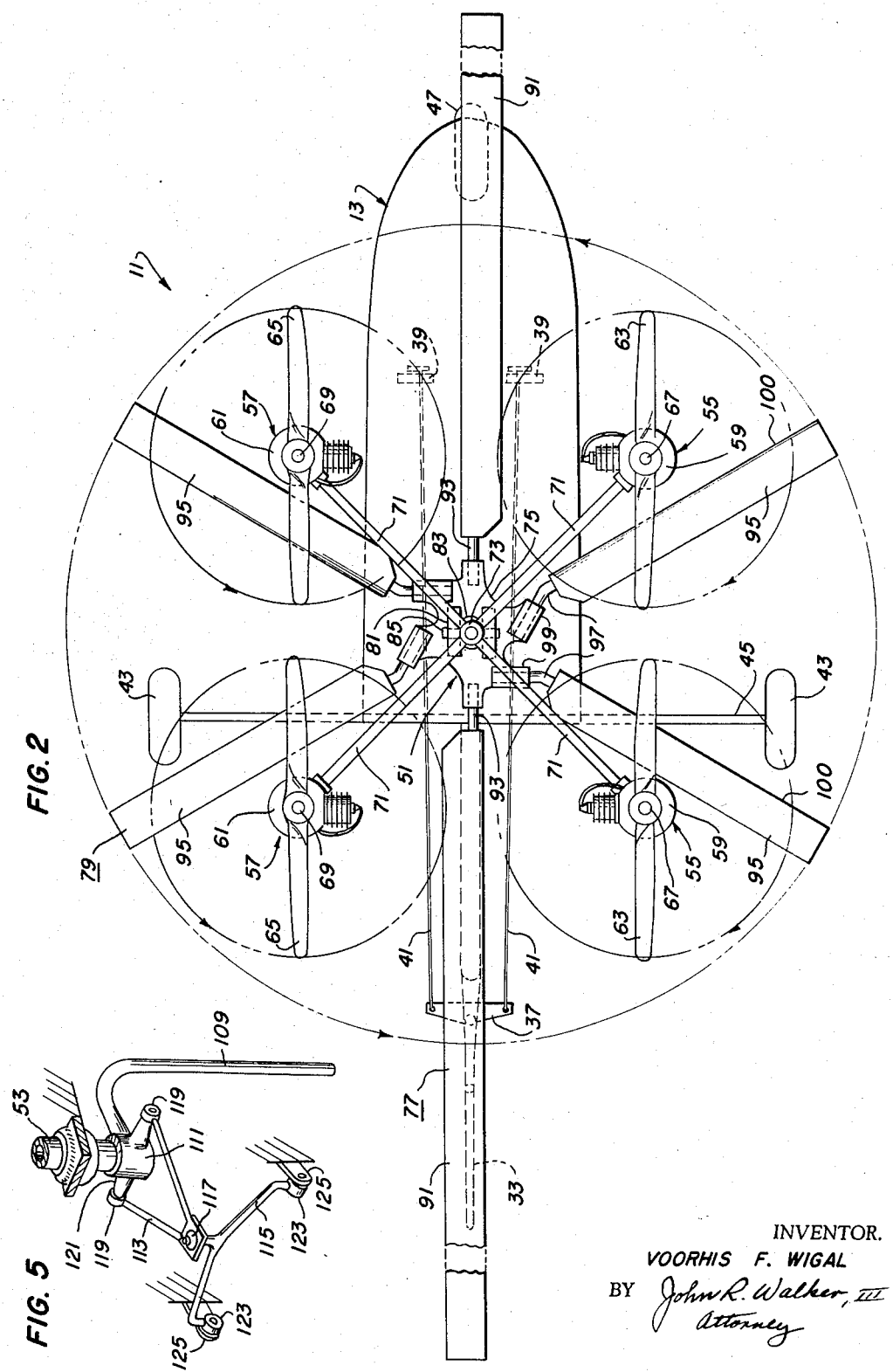

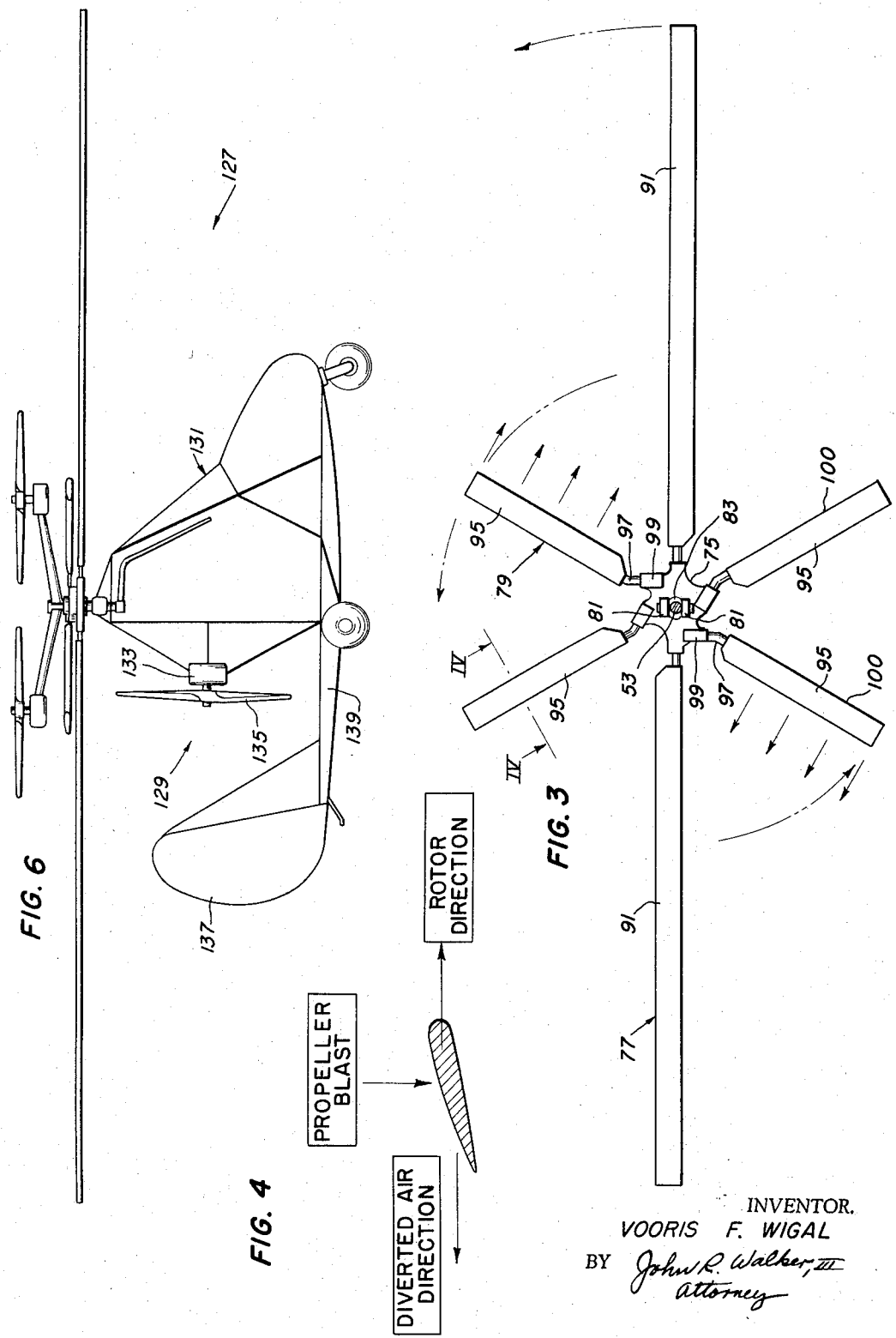

United States Patent Office 3,360,219
Patented Dec. 26, 1967

3,360,219
AIRCRAFT HAVING AIR BLAST POWERED
LIFTING ROTOR
Voorhis F. Wigal, 909 Highland Ave.,
Jackson, Tenn. 38301
Filed July 11, 1966, Ser. No. 570,108
9 Claims. (Cl. 244—17.23)

This invention relates to vertical lift aircraft and particularly to such an aircraft having a free turning lifting rotor powered by a downwardly directed blast of air acting on the blades of the rotor.

Many vertical lift aircraft innovations have been directed toward providing a practical means for driving a lifting rotor without torque reaction on the body of the aircraft. Currently, the practical single-rotor helicopter or vertical lift aircraft utilizes an auxiliary rear mounted propeller for counteracting the rotor drive torque.

The auxiliary propeller type rotor drive torque counteracting means of present day aircraft functions fairly well; however, several disadvantageous features are apparent to those skilled in the art: It is complicated and requires extensive drive line and control mechanisms; since the auxiliary propeller also provides means for turning the aircraft body about a vertical axis, the overall control of the craft is adversely affected; the torque of the auxiliary propeller itself also must be compensated for in the design of the craft and such torque also adversely affects the flight performance; the blast of air from the auxiliary propeller is in a direction perpendicular to the forward line of flight and this is inefficient; the auxiliary propeller blast interferes with the normal gyratory flow of air from the lifting rotor and particularly adversely affects the performance of the craft in takeoff and landing, and in hovering flight.

The principal object of the present invention is to provide a single-rotor vertical lift aircraft in which an idly journaled rotor is driven by a downward blast of air, and an aircraft without rotor drive torque counteracting propellers or the like.

A further object is to provide a vertical lift aircraft which includes paired individually powered contra-directionally operative fan units mounted above the lifting rotor for generating a downward blast of air utilized for driving the rotor.

A further object is to provide a vertical lift aircraft having good attitude control and an aircraft readily responsive and easily handled in flight.

A further object is to provide an aircraft particularly effective and stable in takeoff and landing and in hovering flights.

A further object is to provide an aircraft having low horsepower-weight ratio.

A further object is to provide a safe aircraft having an idly journaled rotor which gyrates freely and automatically in the event of power failure and affords a slow safe descent.

A further object is to provide a substantially small, lightweight, mechanically simple vertical lift aircraft.

A further object is to provide a vertical lift aircraft economical to manufacture and market.

The means by which the foregoing and other objects of the present invention are accomplished and the manner of their accomplishment will be readily understood from the following specification upon reference to the drawings, in which:

FIG. 2 is a top plan view of the aircraft.

FIG. 3 is a top plan view of the rotor taken as on the line 3—3 of FIG. 1.

FIG. 4 is an enlarged cross sectional view of a rotor blade taken as on the line IV—IV of FIG. 3.

FIG. 5 is a perspective view of the rotor control mechanism.

FIG. 6 is a modified embodiment including an auxiliary power plant.

Figure 1:
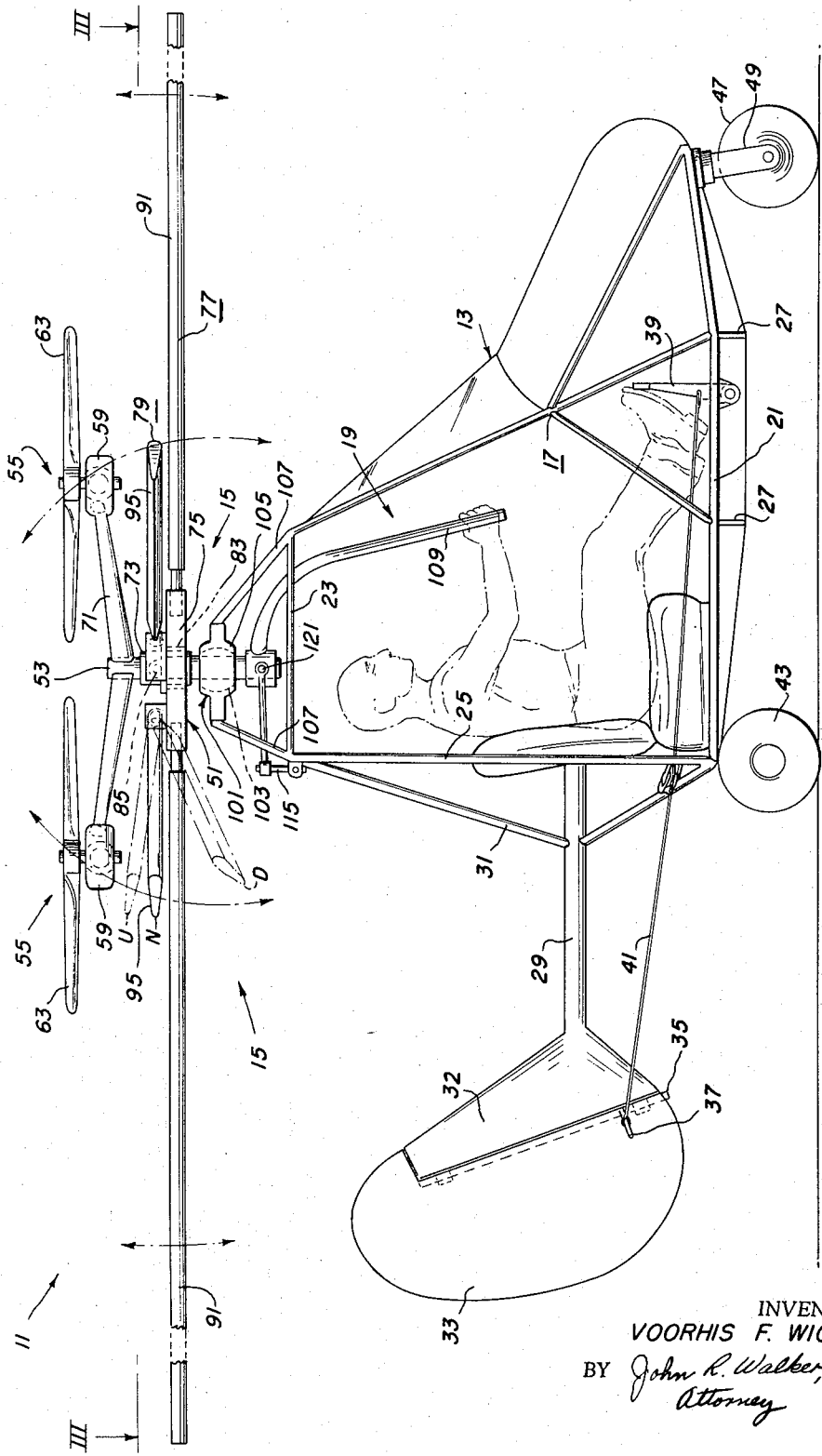
FIG. 1 is a side elevational view of the aircraft of the present invention.

Referring now to the drawings in which the various parts are indicated by reference characters, the principal embodiment of the aircraft (FIGS. 1-5) is indicated by numeral 11 and basically includes a body 13 and lifting means 15 superjacently mounted on the body.

Body 13 includes a skeleton frame 17 constructed of tubular stock and forming a cabin enclosure 19. Frame 17 includes paired upper and lower stringer members 21, 23 respectively and paired side members 25. Cross members 27 (only two shown) interconnect the lower members 21 and interconnect the upper members 23. A tubular boom 29 is fixed to and projects from the rear of body 13 and is supported by diagonal brace members 31. An upright stationary fin 32 is integrally secured to the rearward portion of tubular boom 29, and a rudder blade 33 is pivotally secured to fin 32. A tubular hinge pin 35 is pivotable with the rudder blade and a cross bar 37 is fixed to hinge pin 35. Right and left pivotally mounted foot pedals 39 are mounted in cabin enclosure 19. Paired rudder cables 41 extend between rudder pedals 39 and cross bar 37. Body 13 is provided with tricycle-type landing gear and includes a pair of rear wheels 43 mounted on axle 45 and a front nose wheel 47 supported by a pivotable fork 49.

Lifting means 15 basically includes a rotor 51, a mast 53 movably secured on aircraft body 13, and two pairs of contra-directionally operative fan units 55, 57 and 55, 57. Preferably, fan units 55, 55 and 57, 57 are arranged respectively on opposite sides of body 13. Clockwise rotational units 55, 55 are preferably mounted on the right side of the body of the aircraft; counterclockwise rotational units 57, 57 are mounted on the left side of the body. Clockwise and counterclockwise rotational motors or air-cooled gasoline engines 59, 61 provide the lifting power for body 13. Clockwise and counterclockwise rotational propellers 63, 65 are fixed on drive shafts 67, 69 of engines 59, 61. Perpendicularly arranged tubular outrigger members 71 are fixedly secured to and project from the upper end portion of mast 53. Engines 59, 61 are fixedly secured to the distal end portions of outrigger members 71. Propellers 63, 65 preferably are arranged symmetrically in a square configuration and with the blades of the respective propellers being arranged substantially in a common horizontal plane. Suitable control means (not shown) provide stop and start means and means for regulating the speed of the engines. It should be pointed out that the number of engines are not necessarily four, but there can be other arrangements so long as the engines are paired, with one of each pair turning in one direction and the other of each pair turning in the opposite direction.

Rotor 51 includes inner and outer hub members 73, 75 and primary and secondary blade sets 77, 79 secured on outer hub 75. Inner hub 73 of rotor 51 is idly journalled on the upper medial portion of mast 53; antifriction bearing means (not shown) interengage inner hub 73 and mast structure 53. Flexible joint means join inner and outer hub members 73, 75 and afford pivoted up and down tilted movement of the outer hub relative to the inner hub. A pair of pillow block type bearing members 81 are fixedly secured to the top surface of outer hub 75 and arranged on opposite sides of elongated hub aperture 83 in outer hub 75. Paired trunnion pins 85 project diametrically from the outer cylindrical surface of inner hub 73. Trunnion pins 85 extend respectively through paired bearing members 81 and pivotally support the outer hub and blades complex of the rotor.

Primary blade set 77 preferably includes a pair of blades 91 projecting diametrically from outer hub 75. Support shafts 93 interconnect the proximal end portion of each blade 91 to outer hub member 75. Each primary blade 91 is longitudinally uniform and of somewhat typical cross sectional configuration. Although the chord width of each primary blade of blade set 77 is illustrated as being equal the chord width of each secondary blade of blade set 79, a large size primary blade or such a blade having a wider chord may be utilized in certain embodiments of the invention.

Secondary blade set 79 preferably includes four secondary blades 95 pivotally secured on outer hub 75. An angular shaft 97 and a bearing block 99 endwise pivotally secures each secondary blade 95 on outer hub 75. Each angular shaft 97 is fixed in the proximal end portion of each secondary blade 95 and is pivotally secured in each block 99. Each secondary blade is adapted to pivot above and below a flat neutral position (indicated by letter N) or a 0° attack angle position. When each blade 95 is in the neutral position, the plurality of secondary blades lie substantially in a common horizontal plane. Each secondary blade 95 is swept back at an angle relative to the pivot axis of the blade. It will be noted by referring to FIGS. 2 and 3 that the leading edges 100 of the secondary blades 95 are thus at an angle relative to the respective pivot axes of the blades, and it will further be noted that the leading edge 100 extend radially relative to the rotor 51 when the secondary blades are in the normal positions N. Stop means (not shown) is provided for stopping the pivotal up and down movement of each secondary blade 95.

A ball joint or swivel joint mechanism 101 affords longitudinal canting movement of mast 53 relative to body 13. Swivel joint mechanism 101 includes a ring member 103 fixed on mast 53 and having an outer concave annular surface, and a coacting socket member 105 having a convex inner annular surface. Forward and rearward tubular members 107 fixedly secure swivel joint socket member 105 on the upper portion of frame 17. Swivel joint mechanism 101 provides movable support means for mast 53, rotor 51, and the two pair of fan units, 55, 57 and 55, 57. A downwardly projecting control column 109 is fixed on a collar 111 fixed in turn on the lower end portion of mast 53. Moving the lower end of control column 109 in an orbital path correspondingly moves the upper end of mast 53 and paired fan units 55, 57 and 55, 57 orbitally; mast 53 is adapted to be canted in any horizontal direction.

Connected upper and lower bifurcated yoke members 113, 115 permit orbital movement of mast 53 while preventing the mast from rotating on its axis (see FIG. 5). A ball and socket joint 117 connects upper and lower yoke members 113, 115 together. Apertured eye portions 119 of upper yoke member 113 are pivotally secured respectively on trunnion portions 121 of collar 111. Eye portions 123 respectively of lower yoke member 115 are pivotally secured respectively on a pair of aligned apertured brackets 125 fixed to and projecting respectively from aircraft frame 17.

With reference to FIG. 2, it will be noted that the circular paths respectively of propellers 63, 65 of fan blade units 55, 57 are arranged respectively directly above, and as viewed vertically, within the peripheral bounds of the circular path of secondary blade set 79. Substantially the full stream of air from the propeller of each fan unit 55, 57 engages substantially the full length of each secondary blade. The forcible stream of air from each propeller 63, 65 blows against and tends to urge each secondary blade 95 to a down position (indicated by letter D in FIG. 1). The downwardly directed blast of air from fan units 55, 57 blows against the upper slanted surfaces of each secondary blade and drives the rotor. The centrifugal force of the rotating rotor (and the airfoil surface of the secondary blades) tends to move each secondary blade to a neutral (N) position. The pivotal mounting of each secondary blade permits the abovementioned movement. Also, the pivotal mounting of each secondary blade permits the blades to compensate for gyroscopic precession forces as the rotor and mast are tilted. In addition, it will be understood that the pivotal mounting of primary blades 77 and secondary blades 79 at trunnion pins 85 and bearing members 81, as is well known in the art, lets the blades rock to allow for gyroscopic forces as well as for differential lift between the advancing and retreating blades.

In case of power failure by fan units 55, 57 in flight of the aircraft, each blade of secondary blade set 79 will automatically pivot to an up position (indicated by letter U in FIG. 1). In powerless descending flight, the ambient air passes upwardly through rotor 51 and acts on the upwardly slanted blade surfaces of secondary blades 95 and continues the rotate the rotor. During lifting powered flight, the air diverted rearwardly from the trailing edge surfaces of the secondary blades moves radially outwardly and acts on the primary lifting blades 91.

Although not illustrated, it is contemplated that each secondary blade 95 be provided with stop means for limiting the up (U) position and the down (D) position. Also, control means other than control column 109 may be desirable in certain embodiments of the present invention; steering wheel or floor mounted stick control means may readily be substituted for the direct control column means, if desired. Additional control means (not shown) for adjusting the pivotal position of the secondary blades in flight may be utilized in effecting a more sensitive control of the aircraft.

The following is briefly some of the functions which occur in the operation of the aircraft: When aircraft 11 is in a dormant or at rest disposition, engines 59, 61 are still and the secondary rotor blades 95 are in a down position. When fan unit engines 59, 61 are started and revved up to an intermediate speed, the air pressure acting on the downwardly positioned blades causes rotor 51 to turn at an intermediate speed. Opening the throttles of engines 59, 61 causes rotor 51 to rotate faster and when the total lifting force exceeds the gross weight of the aircraft, it lifts off in hovering flight. As the aircraft lifts from the ground, it may be guided about a vertical axis by manipulating rudder pedals 39. If the control column 109 is moved towards the pilot to cause the plane of rotation of rotor 51 to tilt forwardly, the aircraft will be caused to move forwardly. In fact, any movement of the control column has a corresponding action on the plane of rotation of the rotor and in whatever direction the plane of rotation of the rotor is tilted it will cause the aircraft to move in that direction. The pilot lands the crafts by reducing the power of engines 59, 61 and in so doing allows rotor 51 to rotate at a reduced speed, and the craft to settle to the ground.

A modified embodiment 127 is illustrated in FIG. 6. Embodiment 127 includes an auxiliary power unit 129 supported from aircraft body 131. Power unit 129 is a somewhat typical pusher type arrangement and includes an engine 133 and propeller 135. A rudder 137 mounted from body 131 on boom 139 provides means for turning the aircraft body about a vertical axis. A rotor and fan units, substantially the same as comparable parts in aircraft 11, provide the lifting means of modified embodiment 127. Although a pusher type auxiliary power unit has been described and illustrated, it will be understood that a front mounted tractor type power unit configuration may be utilized in certain embodiments of the invention.

The present invention provides a very practical means for driving a lifting rotor without torque reaction on the body of the craft. The invention provides a substantially small, lightweight, low cost, mechanically simple vertical lift aircraft.

Although the present invention has been described in some detail by way of illustration and example for purposes of clarity or understanding, it is to be understood that it is not to be so limited since changes and modifications may be made therein which are within the full intended scope of this invention as hereinafter claimed.

I claim:
1. In an aircraft having a body, the means for lifting and sustaining said body in flight comprising an upright mast supported from said body; a rotor journalled on said mast including hub structure, a primary blade set secured to and radiating from said hub structure, and a secondary blade set secured to and radiating from said hub structure; and means supported at least in part from said mast for generating a strong steady downwardly directed blast of air under pressure above said rotor and for directing the blast of air downwardly through the circular paths of said primary and said secondary blades.

2. In an aircraft having a body, the means for lifting and sustaining said body in flight comprising an upright mast, means supporting said mast from said body; a rotor idly journalled on said mast; means supported at least in part from said mast for generating a strong steady downwardly directed blast of air under pressure above said rotor and through the path of rotation of said rotor; said rotor including primary blade means acting essentially in the ambient air for lifting said body and secondary blade means arranged in and moved by the downwardly directed blast of air for rotating said rotor.

3. An aircraft as defined in claim 2 in which said rotor includes a hub structure, in which said primary blade means comprises a primary blade set secured to and radiating from said hub structure in a generally horizontal plane, and in which said secondary blade means comprises a secondary blade set and means pivotally securing each secondary blade generally radially from said hub structure and normally in a plane lying above and substantially parallel with the plane of said primary blade set.

4. An aircraft comprising a body; an upright mast, swivel joint means supporting said mast from said body and affording tilted movement of said mast relative to said body; a rotor rotatably supported about said mast including an inner hub journalled on said mast, an outer hub coaxially arranged about said inner hub, flexible joint means joining said inner and said outer hubs and affording limited up and down tilting movement of said outer hub relative to said inner hub, a primary blade set secured to and radiating from said outer hub and arranged substantially in a horizontal plane, a secondary blade set, and means endwise pivotally securing each secondary blade from said outer hub with each said secondary blade being pivotable above and below a substantially flat neutral position, each said secondary blade when in said neutral position extending radially from said outer hub and arranged in a plane lying above and substantially parallel with the plane of said primary blade set; means supported from said mast for generating a strong steady downwardly directed blast of air under pressure above said rotor and through the path of rotation of said primary and said secondary rotor blades; and manually operative means including motion transmitting means for tilting said mast relative to said body thereby affording control of the aircraft.

5. An aircraft as defined in claim 4 in which said means endwise pivotally securing each secondary blade from said outer hub includes pivot means having a pivot axis lying obliquely relative to the leading edge of each said secondary blade whereby each said secondary blade is swept back relative to the pivot axis of the blade.

6. An aircraft as defined in claim 4 in which said means for generating a downwardly directed blast of air above said rotor includes at least one pair of individually powered fan units with each unit including a motor having a vertical drive shaft and a horizontal propeller fixed on said shaft, said pair of fan units being mounted diametrically opposite relative to said upright mast and with the propellers of said pair of fan units being coplanar arranged and contra-directionally operative.

7. An aircraft as defined in claim 6 in which the circular path of rotation of each of said propellers, as viewed from above said aircraft, lies within the peripheral bounds of the circular path of rotation of said secondary blades.

8. An aircraft as defined in claim 4 which includes rudder means mounted from said body for controlling the movement of said body about a vertical axis.

9. An aircraft as defined in claim 4 which includes an auxiliary power unit supported from said body including an engine having a horizontal shaft and a vertical propeller fixed on said shaft.

References Cited
UNITED STATES PATENTS 1,786,576  12/1930  Nelson _____ 244—17.19

MILTON BUCHLER, *Primary Examiner.*

P. E. SAUBERER, *Assistant Examiner.*